(12) United States Patent
Dirstine et al.

(10) Patent No.: US 8,769,525 B2
(45) Date of Patent: Jul. 1, 2014

(54) REMOTE FIRMWARE UPGRADE DEVICE MAPPING

(75) Inventors: Adam D. Dirstine, Rochester, MN (US); Christopher Glen Popp, Winona, MN (US)

(73) Assignee: Digi International Inc., Minnetonka, MN (US)

( * ) Notice: Subject to any disclaimer, the term of this patent is extended or adjusted under 35 U.S.C. 154(b) by 39 days.

(21) Appl. No.: 13/363,069

(22) Filed: Jan. 31, 2012

(65) Prior Publication Data

US 2012/0198435 A1    Aug. 2, 2012

Related U.S. Application Data

(60) Provisional application No. 61/437,829, filed on Jan. 31, 2011.

(51) Int. Cl.
  *G06F 9/44*    (2006.01)
  *G06F 9/445*   (2006.01)
  *G08C 25/02*   (2006.01)

(52) U.S. Cl.
  USPC ........... 717/173; 717/168; 717/170; 717/171; 717/174; 714/748

(58) Field of Classification Search
  None
  See application file for complete search history.

(56) References Cited

U.S. PATENT DOCUMENTS

| | | | |
|---|---|---|---|
| 6,986,134 B1 * | 1/2006 | Foster | 717/177 |
| 7,328,434 B2 * | 2/2008 | Swanson et al. | 717/168 |
| 7,389,409 B2 * | 6/2008 | Swanson et al. | 713/1 |
| 7,853,944 B2 * | 12/2010 | Choe | 717/173 |
| 8,201,162 B2 * | 6/2012 | Okachi et al. | 717/173 |
| 8,607,221 B1 * | 12/2013 | Donahue et al. | 717/173 |
| 2003/0217358 A1 | 11/2003 | Thurston et al. | |
| 2004/0123091 A1 | 6/2004 | Das | |
| 2005/0160418 A1 * | 7/2005 | Jeong et al. | 717/173 |
| 2006/0168578 A1 * | 7/2006 | Vorlicek | 717/168 |
| 2006/0168580 A1 * | 7/2006 | Harada et al. | 717/174 |
| 2006/0190940 A1 * | 8/2006 | Kim et al. | 717/171 |
| 2008/0189363 A1 * | 8/2008 | Tian | 709/203 |
| 2008/0189693 A1 * | 8/2008 | Pathak | 717/168 |
| 2009/0037904 A1 | 2/2009 | Cohen et al. | |
| 2009/0235244 A1 * | 9/2009 | Enomori et al. | 717/170 |

(Continued)

OTHER PUBLICATIONS

Syed Husain et al. "Remote Device Management of WiMAX Devices in Multi-Mode Multi-Access Environment",[Online], IEEE 2008, pp. 1-13, [Retrieved from Internet on Feb. 13, 2014], <http://ieeexplore.ieee.org/stamp/stamp.jsp?tp=&arnumber=4536680>.*

(Continued)

*Primary Examiner* — Thuy Dao
*Assistant Examiner* — Ziaul A Chowdhury
(74) *Attorney, Agent, or Firm* — Fogg & Powers LLC

(57) ABSTRACT

A networked firmware management system is operable to manage firmware in one or more target devices by receiving one or more firmware target specifications from one or more target devices, the firmware target specifications each identifying a firmware target in the target device. The server stores the one or more received firmware target specification, associated with the one or more firmware targets in the target device. When the server receives a firmware update, the server matches a firmware attribute of the received firmware update against the one or more firmware target specifications stored in the server, and sends the received firmware update to any firmware targets in the target device having a firmware target specification that matches the received firmware update attribute.

10 Claims, 3 Drawing Sheets

(56) References Cited

U.S. PATENT DOCUMENTS

| | | | |
|---|---|---|---|
| 2009/0319848 A1* | 12/2009 | Thaper | 714/748 |
| 2010/0050166 A1* | 2/2010 | Chiu et al. | 717/168 |
| 2010/0313191 A1 | 12/2010 | Yin et al. | |
| 2010/0332634 A1 | 12/2010 | Keys | |
| 2011/0154313 A1 | 6/2011 | Nolterieke et al. | |
| 2011/0231542 A1* | 9/2011 | Komano et al. | 709/224 |
| 2012/0198434 A1 | 8/2012 | Dirstine et al. | |
| 2012/0291021 A1 | 11/2012 | Banerjee et al. | |

OTHER PUBLICATIONS

Davar Pishva et al., "Product-Based Security Model for Smart Home Appliances", [Online], IEEE 2008, pp. 32-41, [Retrieved from Internet on Feb. 13, 2014], <http://ieeexplore.ieee.org/stamp/stamp.jsp?tp=&arnumber=4665323>.*

Open Mobile Alliance, "Firmware Update Management Object", [Online], 2006, pp. 1-32, [Retrived from Internet on Feb. 13, 2014], <http://h71028.www7.hp.com/enterprise/downloads/OMADMFUMOv1.0.pdf>.*

Abhishek Sharma et al., "ScoutNode: A Multimodal Sensor Node for Wide Area Sensor Networks", [Online], IEEE 2009, pp. 1-6, [Retrived form Internet on Feb. 13, 2014], <http://ieeexplore.ieee.org/stamp/stamp.jsp?tp=&arnumber=5235300>.*

U.S. Patent and Trademark Office, "Office Action", "U.S. Appl. No. 13/363,095", Jun. 7, 2013, pp. 1-24.

* cited by examiner

REMOTE FIRMWARE UPGRADE DEVICE MAPPING

CLAIM OF PRIORITY

The present application claims the benefit of priority, under 35 U.S.C. Section 119(e), to U.S. Provisional Patent Application Ser. No. 61/437,829, entitled "Remote Firmware Upgrade Device Mapping," filed on Jan. 31, 2011, which is hereby incorporated by reference herein in its entirety.

TECHNICAL FIELD

The document pertains generally to managing firmware upgrades, and more specifically to embodiments of remote device firmware upgrade mapping.

COPYRIGHT NOTICE

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require as robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks are often controlled by a gateway or coordinator device that acts as an interface between the mesh network and the Internet. Many networks such as these are large, comprising tens or hundreds of nodes spread out over a wide area. The gateway device and network nodes in many embodiments are inactive or asleep most of the time, and become active based on a coordinated schedule to perform various operations and communicate with other network nodes.

Further, a variety of node and gateway devices are often employed in complex network installations, including devices from a variety of manufacturers and that perform a variety of different monitoring and control functions. The variety of smart energy, fleet management, medical device networking, and other sensors, controllers, actuators, meters in a network are further often distributed across a wide area, and include geographically remote locations that make centralized control desirable.

Managing and updating gateway and other such devices distributed over large or complex networks such as these is therefore desired.

SUMMARY

Some example embodiments of the invention comprise a networked firmware management system operable to manage firmware in one or more target devices. A server receives one or more firmware target specifications from one or more target devices, the firmware target specifications each identifying a firmware target in the target device. The server stores the one or more received firmware target specification, associated with the one or more firmware targets in the target device. When the server receives a firmware update, the server matches a firmware attribute of the received firmware update against the one or more firmware target specifications stored in the server, and sends the received firmware update to any firmware targets in the target device having a firmware target specification that matches the received firmware update attribute.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
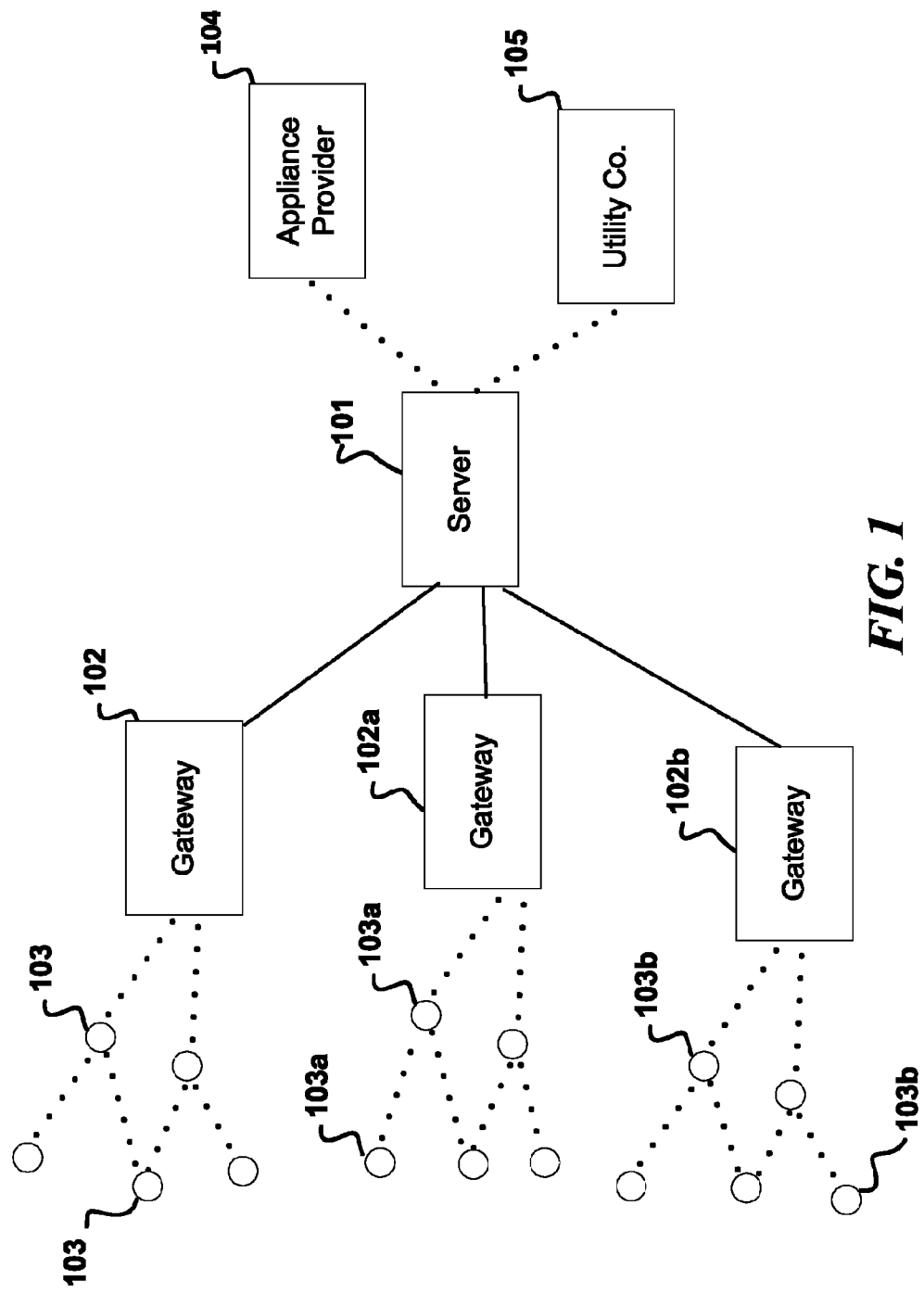
FIG. 1 shows an example environment comprising a server and a plurality of target gateway devices, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data long a route to an intended destination node. Mesh networks are therefore often self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network.

One example of a mesh network standard using wireless radio communication is the ZigBee® mesh network, which was developed by an industry alliance and is related to IEEE standards including 802.15.4™. The retail price of ZigBee-compliant transceivers is nearly a dollar, and a transceiver, memory, and processor can be bought for a few dollars in quantity, making integration of mesh network technology into inexpensive electronic devices economically practical. The standard is intended to support low power consumption at reasonably low data rates, and provides a self-organizing network technology that works well for applications such as control, monitoring, sensing, and home automation.

In this example of wireless mesh technology, one node operates as a gateway or coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

Nodes in some mesh networks can also conserve power by entering a sleep mode, or becoming inactive for extended periods of time when operation is not necessary. For example, a mesh network of ground moisture sensors may only need to take and report measurements every two hours, and need only be awake for a few milliseconds every two hour period. The sleeping nodes in such a network are desirably synchronized by the coordinator during configuration of the network so that they wake at the same time, enabling the nodes to communicate with each other while awake.

But, the wide variety of smart energy, fleet management, medical device networking, and other sensors, controllers, actuators, meters and other such devices that are found in such networks can add complexity to management of network devices such as these. For example, gateway controllers may be from a variety of manufacturers, and configured differently to perform different functions and control different mesh network devices. A typical gateway device may also have a variety of firmware elements that are often updated to fix or improve functionality, such as the operating system, boot loader, and applications.

As the number of gateway devices grows and the firmware becomes more complex, management of firmware images on a variety of devices across a network can become a difficult task. In many installations, code on a central server is custom written to send specific firmware updates to specific target devices such as gateways, requiring knowledge of the identity of the variety of gateway devices in the network and the firmware images associated with each device.

One example embodiment of the invention therefore provides a system and method for remote device firmware upgrade management using automatic firmware image mapping. This is performed in a further example by matching device attributes to corresponding firmware in a server, and providing firmware to those devices having matching attributes.

FIG. 1 shows an example network comprising a number of gateway devices 102 and a server 101, consistent with an example embodiment of the invention. Here, a server 101 such as an iDigi® server is coupled to a number of gateway devices 102. Each of the gateway devices 102 is further linked to a network having a plurality of network devices 103, such as an iDigi® or ZigBee® mesh network. The server 101 in this example can be further coupled to other clients, such as appliance provider 104 and utility company 105.

In operation, the mesh network devices 103 collect data, such as power consumption data or other such data, and relay it to a gateway 102. The gateway is operable to receive data from the mesh network, coordinate operation of the mesh network, and provide received data to server 101. The server 101 receives the data from the mesh network nodes, such as power consumption data and device state data, and is able to forward this information to other parties such as to a utility company 105, an appliance manufacturer 104, or to a building owner via a web interface to monitor things such as power usage and appliance status.

It is not uncommon for mesh network device and gateway providers to provide improved functionality to the devices via firmware updates, such as may be downloaded to the server 101 from a system maintained by the utility company 105 or appliance company 104. A device such as gateway 102 typically identifies how many firmware targets it supports upon connecting with the server 101, along with other data such as a simple description of each target. Prior systems rely on a user to identify what firmware images are to be uploaded to which gateway devices, and to manually upload the firmware to the devices 102 such as via a web browser interface.

This becomes difficult to manage as multiple gateway devices 102 are employed on the same server 101, or when gateway devices 102 support multiple firmware targets. It is becoming increasingly common for a device such as gateway 102 to have different firmware updates for elements such as the boot loader, operating system, application, and configuration. Identification of what firmware is associated with what particular target on what gateway device can make managing updating firmware difficult.

Some embodiments of the invention therefore use a specification identifying a firmware file as part of the gateway device configuration sent to the server 101. The server therefore knows what identifiers can be used to recognize various firmware images, associate them with various gateway device targets, and update the appropriate targets on the gateway devices.

The firmware specification in a further example comprises a file name string, such that the gateway passes a text string to the server that is intended to match at least a portion of the file name of any firmware update for a specific firmware target on the gateway device. For example, an energy monitoring network's gateway device 102 may have firmware target specifications including names such as "energymonitorbootloader" "energymonitoroperatingsystem" "energymonitorapplication", and "energymonitorconfiguration". When the server receives a new firmware file titled "energymonitorapplication14325", it can match the gateway device's firmware target file name specification "energymonitorapplication" to the firmware's file name "energymonitorapplication14325", and update the firmware.

This is performed in a further example by matching an attribute such as the file name of any new firmware file uploaded to the server 101 to a record of firmware target specifications registered by various attached devices, such as gateways 102. The firmware file's attribute is compared to each of the registered firmware target specifications, so that the file can be applied to all matching firmware targets. If multiple devices such as gateways 102 have some or all firmware targets in common, uploading a single firmware file will result in distribution to each of the matching targets that are registered in the server, sparing a user from manually uploading the firmware to each of a potentially large number of gateway or other devices 102.

Figure 2:
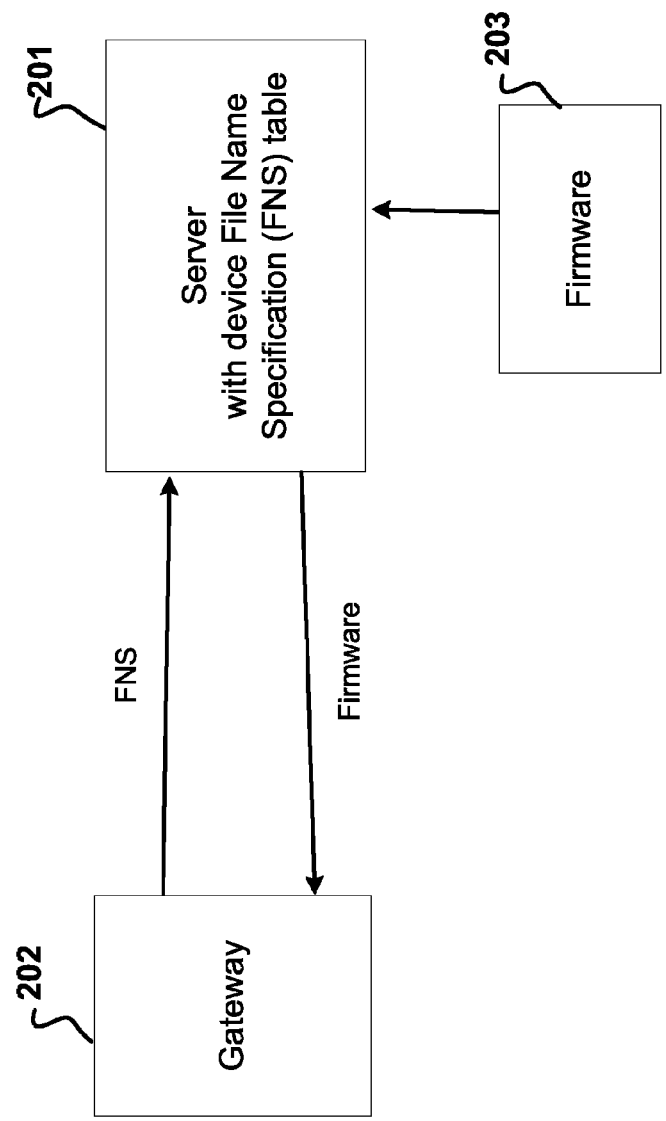
FIG. 2 illustrates exchange of data between a server and a target device, consistent with an example embodiment of the invention.

FIG. 2 illustrates data exchange between a server and a gateway device, consistent with an example embodiment of the invention. The server 201 and gateway 202 are coupled via a network, such as the Internet, facilitating the exchange of data. In other examples, cellular data networks or other suitable networks are employed, enabling communication such as to devices that are not easily directly wired to a network.

The server 201 includes a device file name specification table, as shown in FIG. 2, used to store file name specification data received from various attached devices such as gateway 202. The server is also operable to store firmware files, such as were downloaded from third party network servers 203, as shown in the example of FIG. 1.

In operation, the server 201 establishes communication with a gateway device 202, and the gateway device 202 sends device identification information to the server 201. This includes firmware metadata, including a file name specification for one or more firmware targets on the gateway 202. The file name specification is stored in a file name specification table in the server 201, where it can be used for associating received firmware files with various gateway firmware targets.

When the server 201 obtains new firmware, such as by user-initiated or automatic downloading of firmware from a remote server 203 such as the utility or appliance company servers in the example of FIG. 1, firmware identifying information is extracted from the firmware. This includes in this example examination of the firmware's file name, but in other examples will include other characteristics such as a character string within the firmware, file type or extension, or other such characteristics.

The firmware identifying information extracted from the received firmware file is compared to the file name specification stored in the file name specification table on the server 201, and any matches are identified. The firmware image is then sent to each of the matching firmware targets on each of the gateway devices 202, and the firmware is sent to the appropriate targets and is updated on the targets. Targets can include, but are not limited to, the gateway devices 102 or the network devices 103 shown in FIG. 1.

Figure 3:
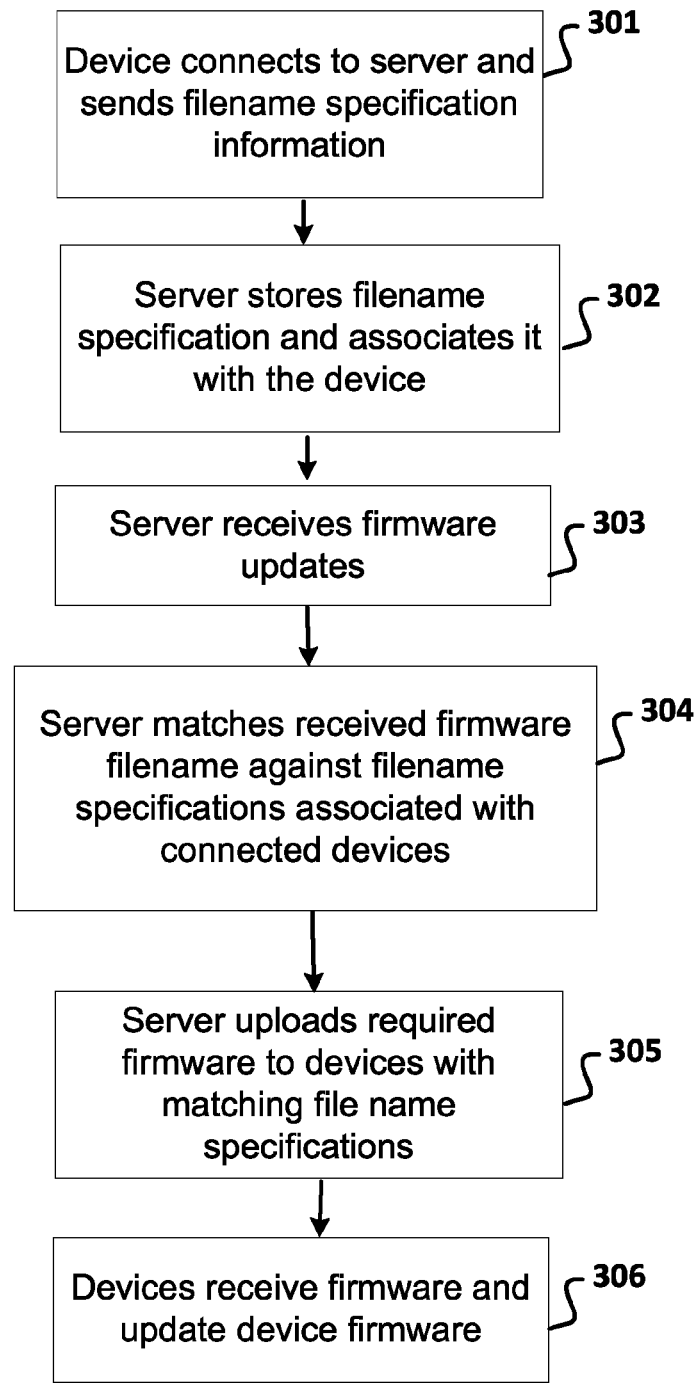
FIG. 3 is a flowchart showing a method of managing firmware in one or more target devices, consistent with an example embodiment of the invention.

This process is illustrated in the flowchart of FIG. 3, which shows an example of using file name specifications to perform firmware updates. At 301, a device such as a mesh network gateway, mesh network node, or other networked device connects to the server and sends file name specification information for one or more firmware targets in the device.

The server stores the file name specification in a file name specification table at 302, and associates the stored specification with the specific device and in some further embodiments a specific firmware target on the device.

The server receives a firmware update at 303, such as by a user retrieving a firmware file from a third-party website, or automated querying and download of new firmware images from a third-party server. The server matches the firmware file name against the file name specification fields in the file name specification table, and identifies any matching firmware targets or devices at 304. The server then uploads the firmware to any matching devices or targets at 305, and the devices receive the firmware and perform a firmware update at 306.

Although the examples presented here use mesh network gateways as firmware target devices, firmware targets in other embodiments include devices such as mesh network nodes, cellular data network nodes, and networked devices such as security, energy, and environmental monitoring and control devices. Similarly, the file name specification is but one example of a firmware attribute that can be sued to match a firmware file with an appropriate target, and other characteristics such as a substring within the firmware file, file extension, or other such characteristic can be used to match firmware files to targets.

In one such more detailed example, a mesh network device coupled to a gateway sends a file name specification associated with a firmware target on the mesh network device to the gateway. The gateway then forwards this file name specification to the server, which sends the target device firmware updates matching the file name specification. When the gateway receives such a firmware update, it forwards the update to the mesh network device, thereby updating the mesh network device's firmware.

The examples presented here illustrate how a firmware attribute such as a file name specification can be used to perform firmware updates for appropriate firmware targets in a network environment, reducing the burden on a user to track and manage firmware revisions across multiple potential target devices.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof. This application is intended to cover any adaptations or variations of the example embodiments of the invention described herein. It is intended that this invention be limited only by the claims, and the full scope of equivalents thereof.

What is claimed is:

1. A computer implemented method of operating a networked firmware management system, comprising:

receiving, in a server, one or more firmware target specifications from one or more target devices, the firmware target specifications each identifying a firmware target in the target device, wherein the firmware target specification comprises a file name specification;

receiving from the one or more target devices, in a server, one or more firmware target specifications from one or more attached devices networked to the one or more target devices;

storing the one or more received firmware target specifications in the server, associated with the one or more firmware targets in the target device, wherein the server includes a device file name specification table, which stores file name specifications and corresponding target devices and corresponding firmware targets, wherein the file name specifications, the corresponding target devices and the corresponding firmware targets are distinct, wherein the one or more received firmware target specifications are stored in the device file name specification table;

receiving a firmware update in the server;

matching a firmware attribute of the received firmware update against the one or more firmware target specifications stored in the server from the one or more target devices or the one or more attached devices;

sending the received firmware update to any firmware targets in the target device or the one or more attached devices having a firmware target specification that matches the received firmware update attribute.

2. The method of operating a networked firmware management system of claim 1, wherein receiving a firmware update in the server comprises at least one of automatically polling a remote server for firmware updates, and a user downloading a firmware update from the remote server.

3. The method of operating a networked firmware management system of claim 1, wherein the one or more target devices are mesh-network gateway devices.

4. A computer implemented method of operating a networked firmware management system, comprising:
sending one or more firmware target specifications from a target device to a server, the firmware target specifications each identifying a firmware target in the target device, wherein the firmware target specification comprises a file name specification, wherein the server includes a device file name specification table, which stores the sent file name specifications and corresponding target devices and corresponding firmware targets, wherein the file name specifications, the corresponding target devices and the corresponding firmware targets are distinct;
sending firmware target specifications for one or more attached devices networked to the target device, from the target device to the server;
receiving a firmware update from the server in a firmware target in the target device, the firmware update having a firmware attribute that matches the sent firmware target specifications for the firmware target; and
receiving a receiving a firmware update from the server in the target device having a firmware attribute that matches the sent firmware target specifications for the one or more attached devices, and sending the firmware update from the target device to the one or more attached devices.

5. The method of operating a networked firmware management system of claim 4, wherein the one or more target devices are mesh network gateway devices.

6. A networked firmware management system server, comprising:
a firmware management module, stored in a non-transitory computer-readable medium, operable to:
receive one or more firmware target specifications from one or more target devices in a server, the firmware target specifications each identifying a firmware target in the target device, wherein the firmware target specification comprises a file name specification;
receive, from the one or more target devices, one or more firmware target specifications for one or more attached devices networked to the one or more target devices;
store the one or more received firmware target specification in the server, associated with the one or more firmware targets in the target device, wherein the server includes a device file name specification table, which stores file name specifications and corresponding target devices and corresponding firmware targets, wherein the file name specifications, the corresponding target devices and the corresponding firmware targets are distinct, wherein the one or more received firmware target specifications are stored in the device file name specification table;
receive a firmware update in the server;
match a firmware attribute of the received firmware update against the one or more firmware target specifications from the one or more target devices or one or more attached devices stored in the server; and
send the received firmware update to any firmware targets in the target device or the one or more attached devices having a firmware target specification that matches the received firmware update attribute.

7. The networked firmware management system server of claim 6, wherein receiving a firmware update in the server comprises at least one of automatically polling a remote server for firmware updates, and a user downloading a firmware update from the remote server.

8. The networked firmware management system server of claim 6, wherein the one or more target devices are mesh network gateway devices.

9. A networked firmware management system target device, comprising:
a firmware management module, stored in a non-transitory computer-readable medium, operable to:
send one or more firmware target specifications from a target device to a server, the firmware target specifications each identifying a firmware target in the target device, wherein the firmware target specification comprises a file name specification, wherein the server includes a device file name specification table, which stores the sent file name specifications and corresponding target devices and corresponding firmware targets, wherein the file name specifications, the corresponding target devices and the corresponding firmware targets are distinct;
send firmware target specifications for one or more attached devices networked to the target device from the target device to the server;
receive a firmware update from the server in a firmware target in the target device, the firmware update having a firmware attribute that matches the sent firmware target specifications for the firmware target; and
receive a firmware update from the server in the target device having a firmware attribute that matches the sent firmware target specifications for the one or more attached devices, and send the firmware update to from the target device to the one or more attached devices.

10. The networked firmware management system target device of claim 9, wherein the one or more target devices are mesh network gateway devices.

* * * * *